United States Patent [19]

Eriksson

[11] Patent Number: 5,219,010
[45] Date of Patent: Jun. 15, 1993

[54] DEVICE FOR FEEDING ELONGATED OBJECTS

[76] Inventor: Peter Eriksson, Box 4, S-810, 20 Österfärnebo, Sweden

[21] Appl. No.: 776,417
[22] PCT Filed: May 25, 1990
[86] PCT No.: PCT/SE90/00352
§ 371 Date: Nov. 22, 1991
§ 102(e) Date: Nov. 22, 1991
[87] PCT Pub. No.: WO90/13999
PCT Pub. Date: Nov. 29, 1990

[30] Foreign Application Priority Data

May 24, 1989 [SE] Sweden ................................ 8901840

[51] Int. Cl.$^5$ ........................... B27L 1/00; B27C 1/12
[52] U.S. Cl. ............................... 144/2 Z; 144/242 D; 144/343
[58] Field of Search ............... 144/2 Z, 3 D, 246 R, 144/246 D, 246 E, 246 F, 343

[56] References Cited

U.S. PATENT DOCUMENTS

| | | | |
|---|---|---|---|
| 4,081,007 | 3/1978 | Loigerot | 144/2 Z |
| 4,515,192 | 5/1985 | Eriksson | 144/246 F |
| 4,766,939 | 8/1988 | Forslund | 144/242 D |
| 4,800,936 | 1/1989 | Pomies et al. | 144/34 R |
| 4,834,156 | 5/1989 | Forslund | 144/2 Z |
| 5,082,036 | 1/1992 | Vierikko | 144/246 F |

Primary Examiner—W. Donald Bray
Attorney, Agent, or Firm—Gifford, Groh, Sprinkle, Patmore and Anderson

[57] ABSTRACT

A device for feeding tree trunks comprises a body structure (1) and support members (2) arranged on the body structure and supporting members (3) for feeding a tree trunk located between the feed members. The support members with associated feed members are moveable towards and away from each other by means of power members (4) to adjust the distance between the feed members located on either sides of the tree trunk to the coarseness of the trunk. The device comprises members (5), which by abutment against the trunk locates the same so that longitudinal center lines of the trunk will obtain different positions generally transversely to the direction (R) of the relative mobility of the feed members towards and away from each other in dependence of the trunk coarseness. The device comprises means (24, 25) for displacing the feed members (3) supported by the support members (2) relative to the body structure (1) to maintain the feed members (3) in a position generally opposite to the trunk independently of the varying location of the longitudinal center line of the trunk occurring due to coarseness variation.

14 Claims, 9 Drawing Sheets

DEVICE FOR FEEDING ELONGATED OBJECTS

FIELD OF INVENTION AND PRIOR ART

This invention is related to a device according to the preamble of appendent claim 1. The device is primarily intended to have the character of a tree processor arranged to subject trees or tree trunks to any arbitrary processing. Such processing may comprise one or more of the following processing steps: gripping and felling standing trees, delimbing of tree trunks, barking of tree trunks and cutting of tree trunks into desired lengths.

Tree trunks have different coarseness between themselves as well as with regard to an individual tree trunk. In order to be able to feed tree trunks through a tree processor its feed members must be fairly correctly located and in contact with the tree trunk. Difficulties are involved in achieving such a correct contact over a wide coarseness range. Therefore, one proceeds most often by providing tree processors in different coarseness classes, e.g. one processor intended for the small dimension tree trunks occurring in connection with thinning work and another for the coarser trunks to be processed on final felling. It is to be pointed out that it is not a practically useful solution to increase the width of the feed rolls parallel to their axes of rotation since it makes the processor unacceptably bulky and involves increased costs for the feed rolls.

However, a device according to the preamble of claim 1 is known by SE B 457 069. This device has feed members, which on movement thereof towards and away from each other also will be displaced relative to the body structure so that the feed members will be located generally opposite to the tree trunks independently of coarseness variations thereof. More specifically, this is obtained by means of parallel systems of arms, which for each of the feed members form an articulated quadrangle, the articulation axes of which extend at acute angles to the axes of rotation of rolls comprised in the feed members. Such parallel systems of arms cause disadvantages in so far as being relatively costly and besides having a relatively great space requirement.

SUMMARY OF THE INVENTION

The object of the present invention is to devise ways to develop the device defined in the preamble of claim 1 so that it becomes capable of carrying out the coarseness dependent displacement of the first feed members while having a simple construction and a compact design.

This object is obtained according to the invention primarily by means of the feature defined in the characterizing part of appendent claim 1.

Preferable developments of the invention are defined in the dependent claims.

BRIEF DESCRIPTION OF THE DRAWINGS

With reference to the enclosed drawings, a more specific description of embodiment examples of the invention will follow hereinafter.

In the drawings.

DETAILED DESCRIPTION OF THE EMBODIMENT ACCORDING TO FIGS. 1–6

Figure 1:
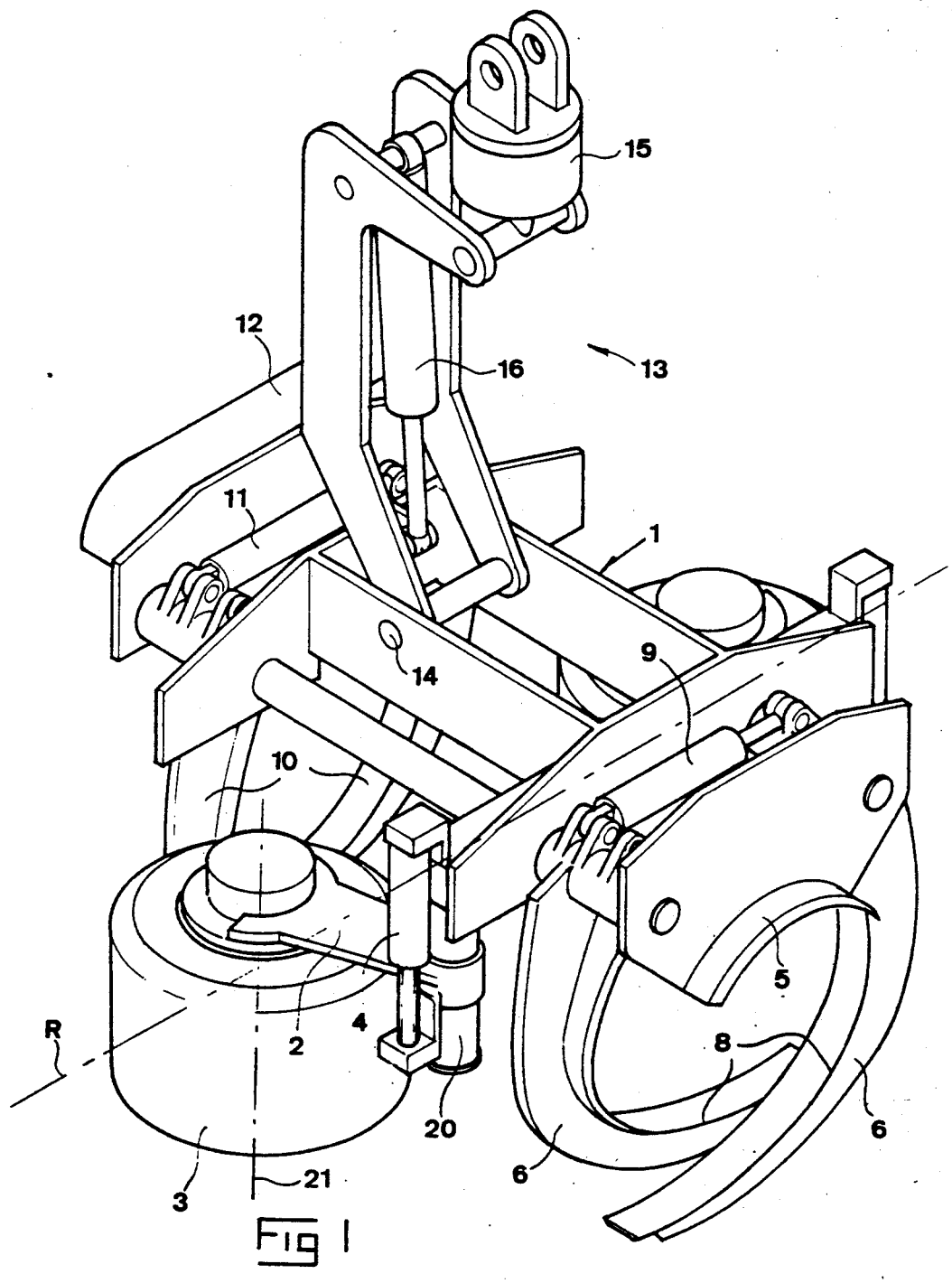
FIG. 1 is a diagrammatical perspective view of a first embodiment of the device according to the invention.
Figure 2:
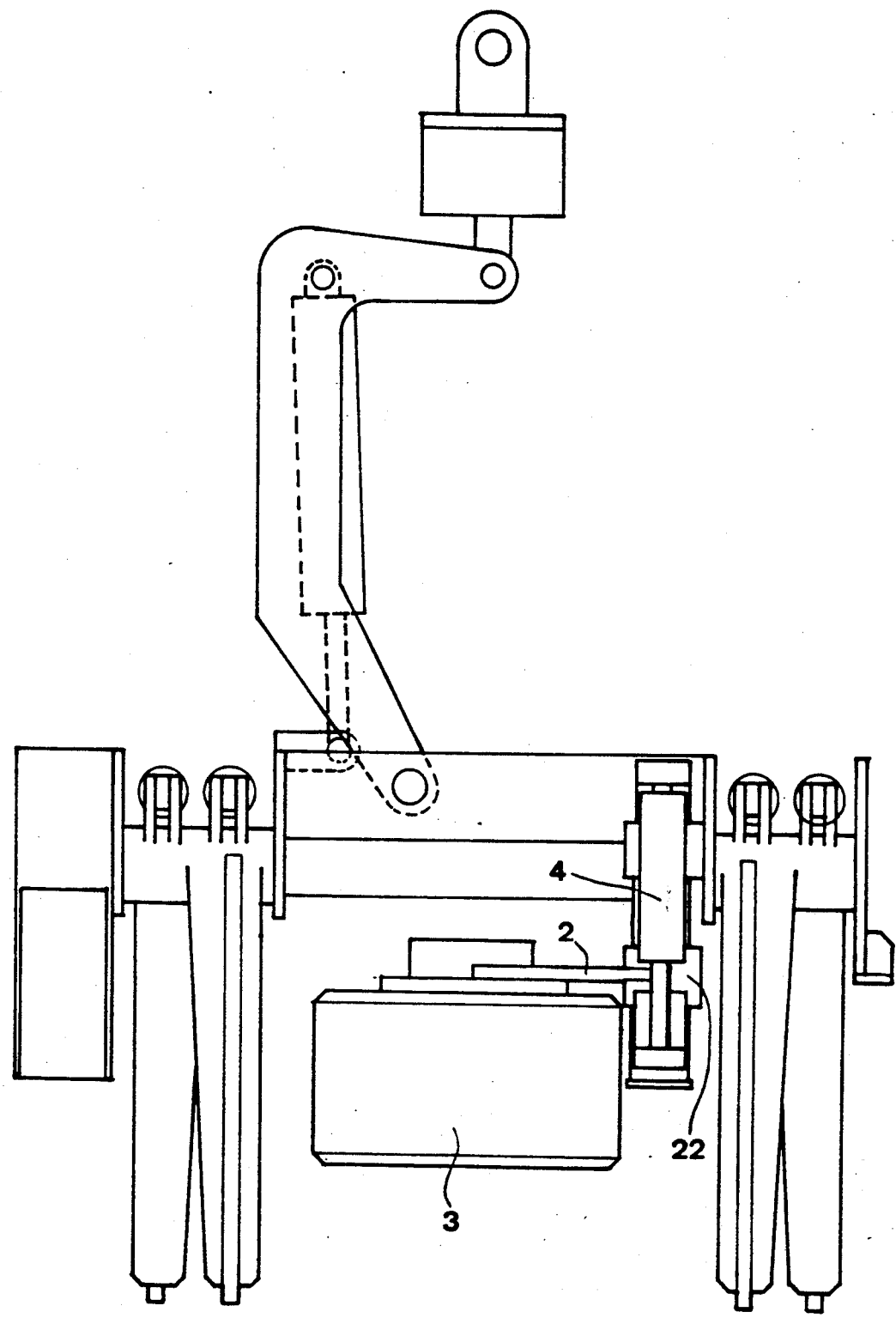
FIG. 2 is a side view of the device in FIG. 1.

The tree processor according to FIGS. 1–6 comprises a body structure 1 and arm like support members 2, which are arranged on the body structure and which support feed members 3 in the form of feed rolls. It is to be pointed out that the feed members instead could be formed as chains running between at least two diverting rolls, a chain part running between these rolls being intended for contacting a tree trunk in the processor for feeding purposes.

Feed members 3 are intended to feed a tree trunk located between themselves through the processor, the support members 2 being, together with the associated feed members 3, by means of power means 4 moveable towards and away from each other to adjust the distance between the feed members located on opposite sides of the tree trunks to the actual coarseness of the trunk. In the illustrated example with feed members in the form of feed rolls 3 only two such feed rolls are illustrated, but it should be understood that also additional feed rolls may be arranged.

Members 5, 6 are provided on the body structure to carry out delimbing of the tree trunk when the latter is moved through the processor by means of feed rolls 3. In the example, the delimbing member 5 is formed by a shearing knife, which is rigidly arranged in relation to the body structure 1 and comprises a surface 7 for contacting the tree trunk during its transport through the processor. The delimbing members 6 comprise as well in this embodiment shearing edges and these are arranged on arms, which are pivotably mounted on the body structure 1 and operable towards and away from each other by means of a power means 9, e.g. a hydraulic cylinder.

The processor may also at its end to the rear in FIG. 1 comprise arm like members 10, which are pivotable towards and away from each other by power means 11, e.g. a hydraulic cylinder. Also the arm members 10 may comprise delimbing members, e.g. in the form of shearing edges.

The components 6, 10 also serve for gripping and holding a tree trunk in the processor. The processor may also in a manner known per se comprise, at its rear end, a device 12, e.g. a chain saw, to cut the trunks into suitable lengths.

A carrying device 13 is rotatably connected to the body structure 1 of the processor about an axle 14, said carrying device being adapted for connecting, possibly with interposition of a rotator 15, the processor to an arbitrary carrier, e.g. a crane arranged on a terrain vehicle. Power means 16, e.g. a hydraulic cylinder, is arranged to enable rotation upwardly of the body structure 1 of the processor so that the processor may embrace a standing tree. Power means 16 acts between a point on the carrying device 13 and a point on the body structure 1.

Figure 3:
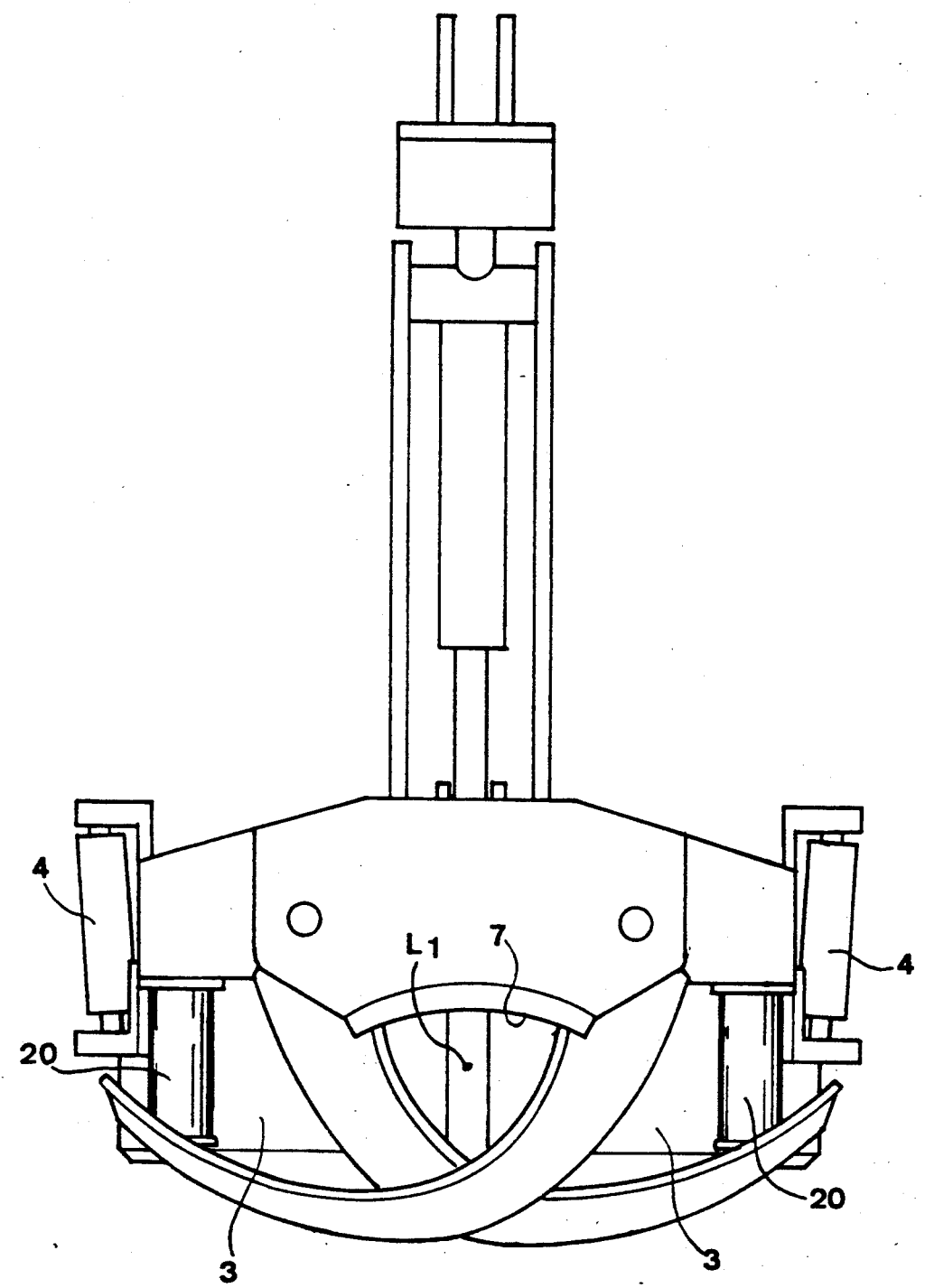
FIG. 3 is a view of the device from its forward end, the device being adjusted to feed a thin object or tree trunk.
Figure 4:
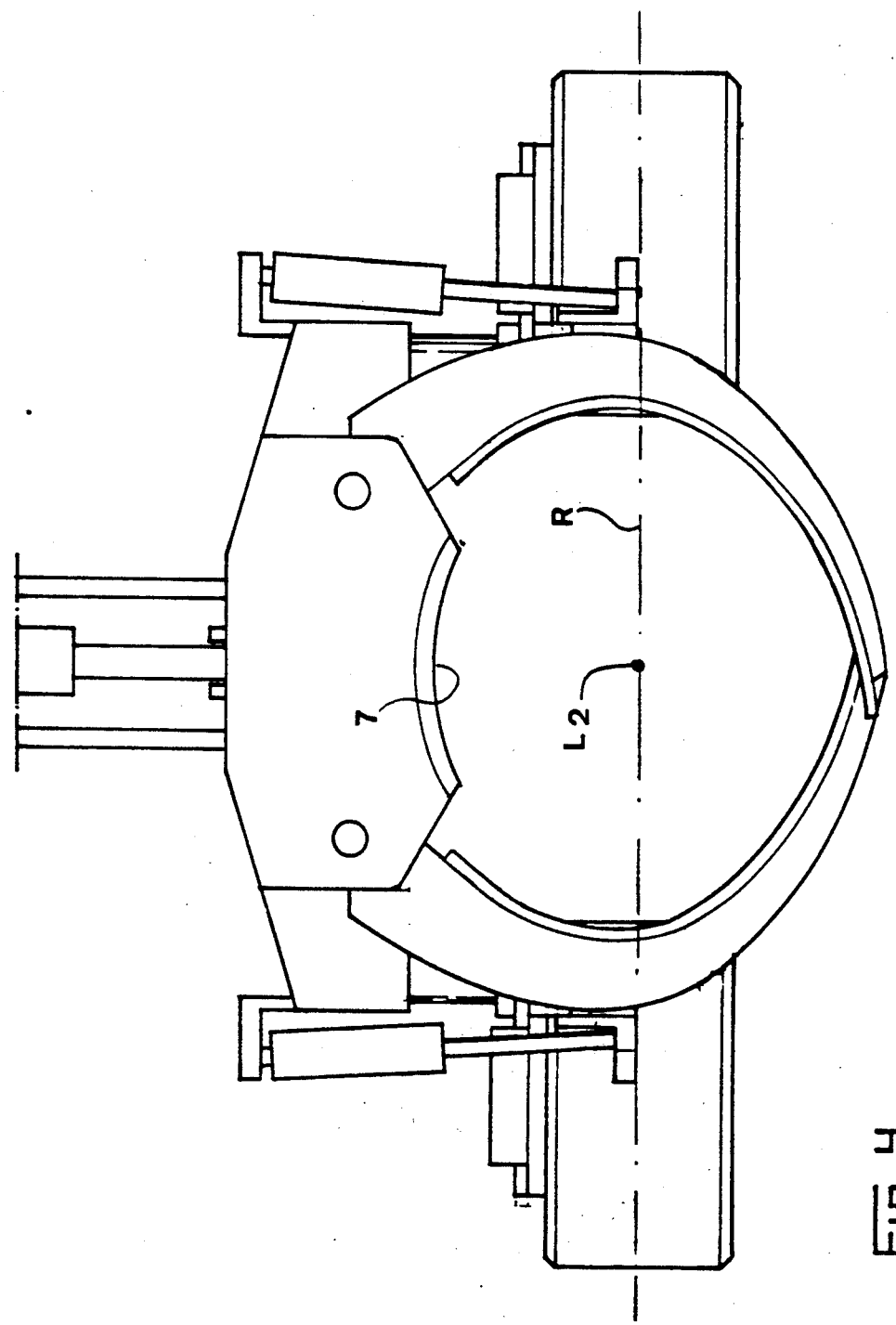
FIG. 4 is a view similar to FIG. 3 but with the device adjusted for a coarse object or tree trunk.

The delimbing member 5 rigidly mounted relative to the body structure 1 forms, with its trunk contact surface 7 and possibly in combination with further components for this purpose on the body structure 1, means, which by contacting the trunk locate the same so that longitudinal center lines of different tree trunks will obtain different positions generally transversely to the direction R of the relative mobility of the feed rolls 3 towards and away from each other in dependence upon the coarseness of the trunks. In other words, the upper mantle surface portion of the trunks will contact the surface 7 in the position of the processor for delimbing, said position being illustrated in FIGS. 1-6 and in which the trunk is located generally horizontally. This means that with the processor adjusted for a relatively thin trunk (see FIG. 3) the longitudinal center line L1 of the trunk will lie relatively close to the support surface 7. However, with a relatively coarse trunk held in the processor the longitudinal center line L2 of the trunk will lie relatively far from the support surface 7 (FIG. 4).

The processor comprises means 17, 18 to displace each of the feed rolls 3 relative to the body structure 1 and accordingly relative to the support surface 7 in order to maintain the feed rolls in a position generally opposite to the trunk on either sides thereof independently of the varying location of the longitudinal center line of the trunk occurring due to coarseness variation. This appears clearly on a comparison of FIGS. 3 and 4, from which it appears that the feed rolls 3 in FIG. 3 are located in a relatively high position with middle points of their adjacent peripherical portions on the same level as and opposite to the indicated longitudinal center line L1 of a relatively thin trunk. In FIG. 4 on the other hand, the feed rolls 3 are lowered relative to the position in FIG. 3 so that still middle points on the adjacent peripherical portions of the feed rolls are located opposite to each other and on the same level as the longitudinal center line L2 for a more coarse trunk.

Figure 5:
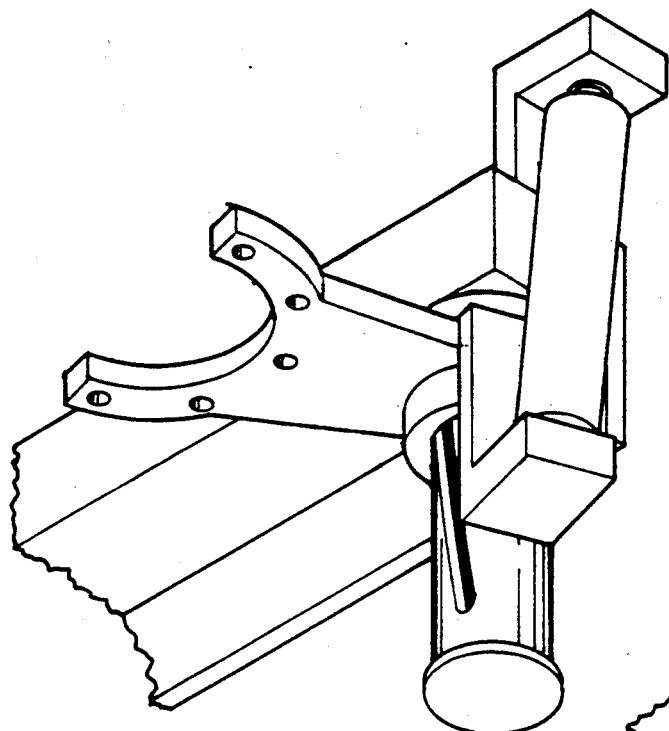
FIG. 5 is a perspective view of a portion of the device according to preceding Figures.
Figure 6:
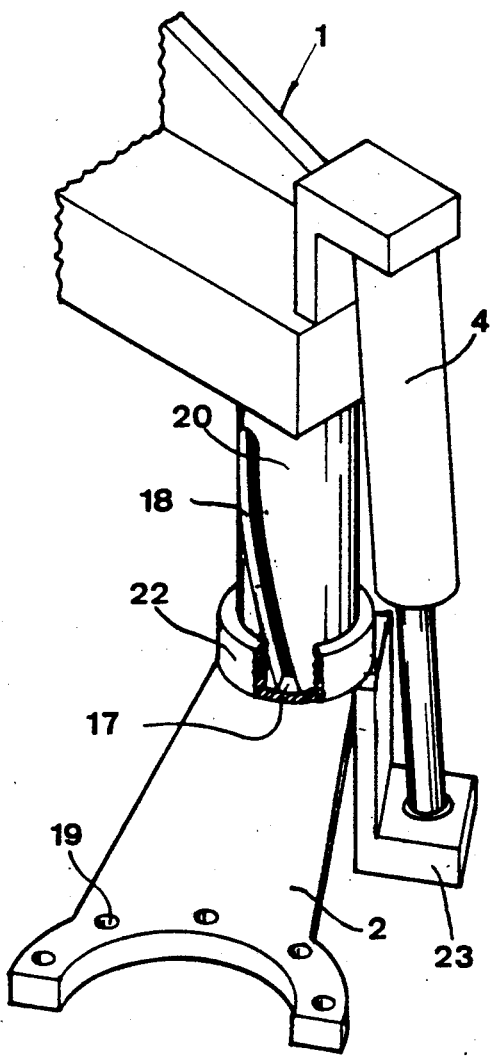
FIG. 6 is a view similar to FIG. 5 but illustrating a different position.

The displacement means comprise for each of the feed rolls 3 control members 17, 18. The more specific design for one of the feed rolls 3 is indicated in FIGS. 5 and 6, namely for the feed roll located to the left in FIG. 1, the viewing direction being perspective and obliquely from behind. It is to be understood that the arrangement is entirely analogous for the other of the feed rolls.

The control members 17, 18 are arranged for producing the displacement of the feed roll in question in a predetermined relation to the movement of the feed roll towards and away from the other feed roll. More specifically, the control members 17, 18 are of a mechanically interacting design, a first control member 17 being connected to a support member 2, whereas a second control member 18 interacting with the first control member is connected to the body structure 1. The feed roll 3 itself does not appear from FIGS. 5 and 6 but it is intended to be secured to the extreme end of the support member 2 by means of securing means projecting through the holes 19. For the rest, the feed rolls may be of the type comprising hydraulic motors built into their hubs.

Each of the support members 2 is pivotably arranged on the body structure 1 about axes 20 generally parallel to the axes of rotation of the feed rolls. The feed rolls 3 and support members 2 will accordingly be pivotable in parallel planes toward and away from a trunk received in the processor, the axes of rotation of the feed rolls extending perpendicularly to these planes, which are generally parallel to planes being horizontal and extending through longitudinal center lines for trunks in the processor.

The feed rolls will accordingly describe pivoting movements toward and away from each other. It appears from this that the previously mentioned direction R for the relative movement of the feed rolls towards and away from each other should be interpreted as an indication in general of what is intended, namely the movement components of the feed rolls giving rise to movement of the rolls towards and away from each other respectively.

The control members 17, 18 are arranged to produce displacement of each of the support members 2 along axis 20 (see again FIGS. 5 and 6) simultaneously with pivoting of the support member 2 about axis 20. The axis 20 is the embodiment an axle secured to the body structure 1 against relative rotation thereto, whereas the support member 2 comprises a sleeve 22 surrounding axle 20. One 18 of the control members is formed by an obliquely extending groove in axle 20 whereas the remaining control member 17 is formed by a projection received in the groove, said projection being attached relative to the sleeve 22. It is to be mentioned that it would also be possible to invert the device in the sense that the groove 18 could be arranged in the sleeve whereas the projection 17 could be arranged on axle 20.

A power means 4 of a type variable in length, e.g. a hydraulic cylinder, is in the embodiment arranged for each of the support members 2. It appears from FIGS. 5 and 6 how this power means with its upper end is connected to body structure 1 and with its lower end to an attachment 23 rigidly connected to support member 2. It appears that the groove 18 has such inclination that the support member 2 with associated feed roll will, on contraction of power means 4, be pivoted inwardly towards the other feed roll at the same time as the support member and feed roll are raised during the movement of projection 17 along groove 18. Since the corresponding is valid for the other feed roll it is now apparent that the processor in dependence upon trunk coarseness is adjustable between the positions according to FIGS. 3 and 4 and that pivoting of the support members and feed rolls automatically cause the displacement along axles 20 which is aimed at. It is evident that power means 4, due to the inclination which occurs (compare the positions according to FIGS. 5 and 6) should be attached to body structure 1 and attachment 23 by hinges of a universal type.

The processor is used in the following way: when gripping a standing tree, the processor is pivoted about 90° by means of power means 16 so that the axes of rotation of feed rolls 3 become generally horizontal. The feed rolls are then moved away from each other. The trunk may be embraced by means of arms 6 and 10, whereupon the tree is cut by the cutting device 12. The trunk is then rotated to horizontal position (see FIG. 1), whereupon feed rolls 3 are pressed against the trunk and the latter can be fed through the processor while the members 5, 6 produce delimbing. The feed rolls 3 obtain automatically the correct height relative to the trunk by means of the combination of pivoting/raising of the support members 2 and feed rolls described with assistance of FIGS. 5 and 6. As the diameter of the trunk decreases towards the top, the feed rolls 3 are moved closer and closer to each other and they will successively be raised in dependence upon the diameter decrease.

DETAILED DESCRIPTION OF THE EMBODIMENT ACCORDING TO FIGS. 7-12

Also the tree processor according to FIGS. 7-12 comprises a body structure 1 and arm like support members 2, which are arranged on the body structure and which support feed members 3 in the form of feed rolls. It is to be pointed out that the feed members instead could be formed as chains running between at least two diverting rolls, a chain part running between these rolls being intended for contacting a tree trunk in the processor for feeding purposes.

Feed members 3 are intended to feed a tree trunk located between themselves through the processor, the support members 2 being, together with the associated feed members 3, by means of power means 4 moveable towards and away from each other to adjust the distance between the feed members located on opposite sides of the tree trunks to the actual coarseness of the trunk. In the illustrated example with feed members in the form of feed rolls 3 only two such feed rolls are illustrated, but it should be understood that also additional feed rolls may be arranged.

Members 5, 6 are provided on the body structure to carry out delimbing of the tree trunk when the latter is moved through the processor by means of feed rolls 3. In the example, the delimbing member 5 is formed by a shearing knife, which is rigidly arranged in relation to the body structure 1 and comprises a surface 7 for contacting the tree trunk during its transport through the processor. The delimbing members 6 comprise as well in this embodiment shearing edges and these are arranged on arms, which are pivotably mounted on the body structure 1 and operable towards and away from each other by means of a power means 9, e.g. a hydraulic cylinder.

Figure 7:
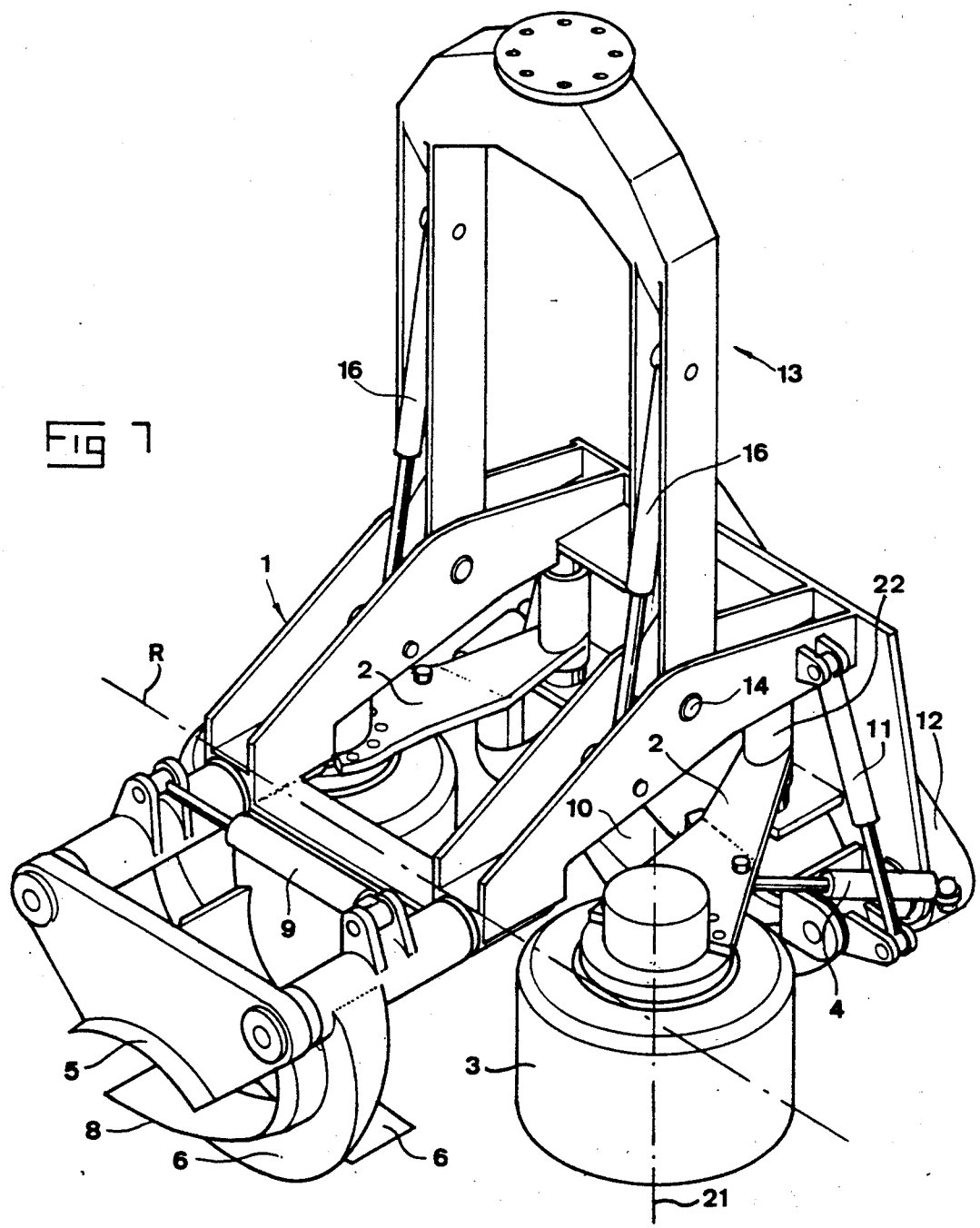
FIG. 7 is a perspective view of a second embodiment according to the invention.
Figure 8:
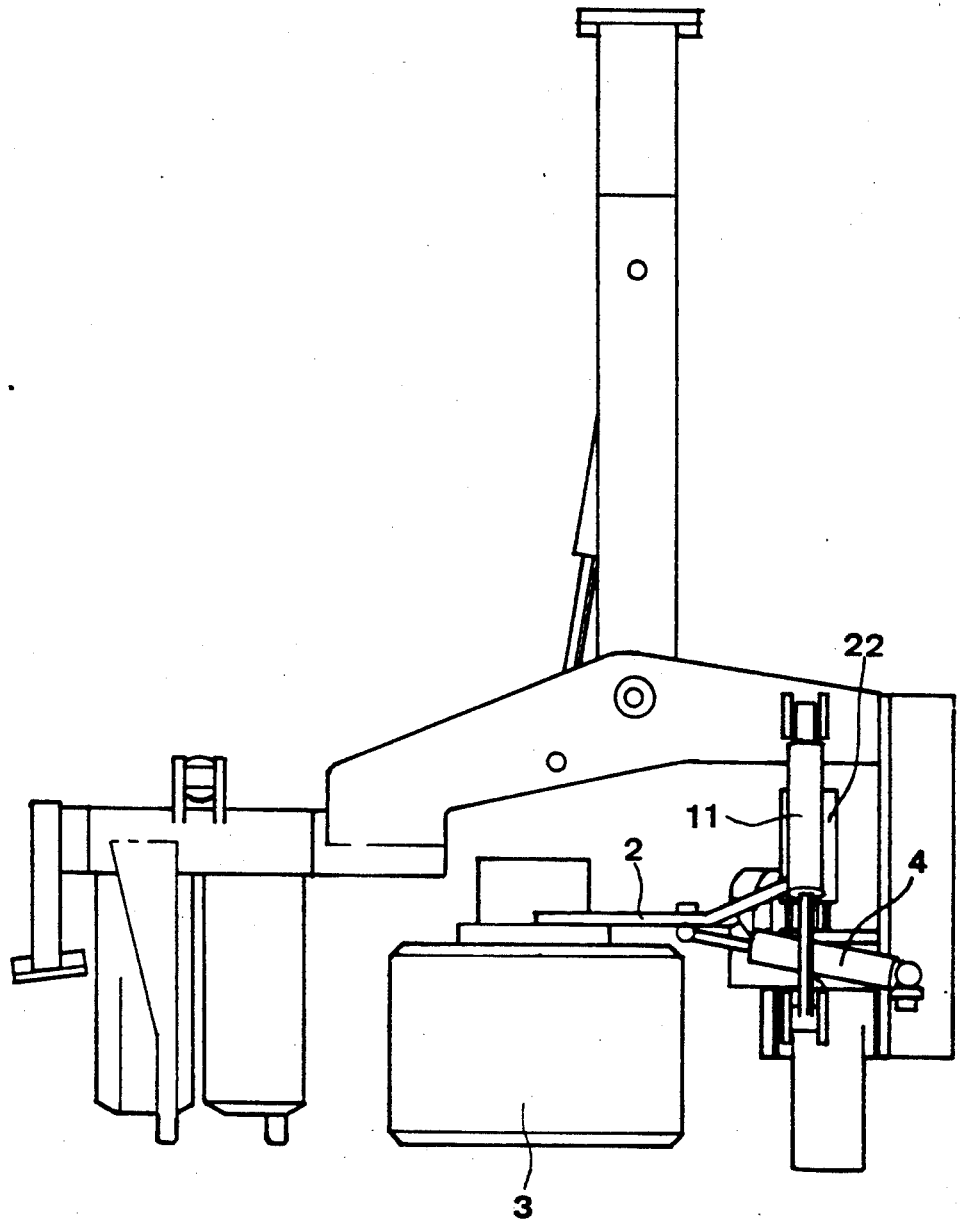
FIG. 8 is a side view of the embodiment according to FIG. 7.

The processor may also at its end to the rear in FIG. 7 comprise an arm like member 10, which is pivotable by power means 11, e.g. a hydraulic cylinder. Also the arm member 10 may comprise delimbing members, e.g. in the form of shearing edges.

The components 6, 10 also serve for gripping and holding a tree trunk in the processor. The processor may also in a manner known per se comprise, at its rear end, a device 12, e.g. a chain saw, to cut the trunks into suitable lengths.

A carrying device 13 is rotatably connected to the body structure 1 of the processor about an axle 14, said carrying device being adapted for connecting, possibly with interposition of a rotator, the processor to an arbitrary carrier, e.g. a crane arranged on a terrain vehicle. Power means 16, e.g. hydraulic cylinders, are arranged to enable rotation upwardly of the body structure 1 of the processor so that the processor may embrace a standing tree. Power means 16 act between points on the carrying device 13 and points on the body structure 1.

Figure 9:
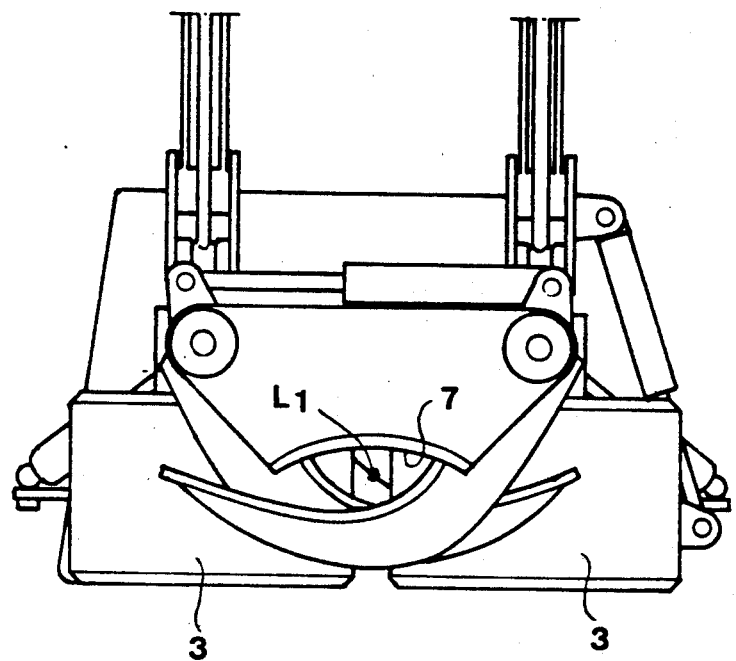
FIG. 9 is a front view illustrating the device adjusted for a thin trunk or object.
Figure 10:
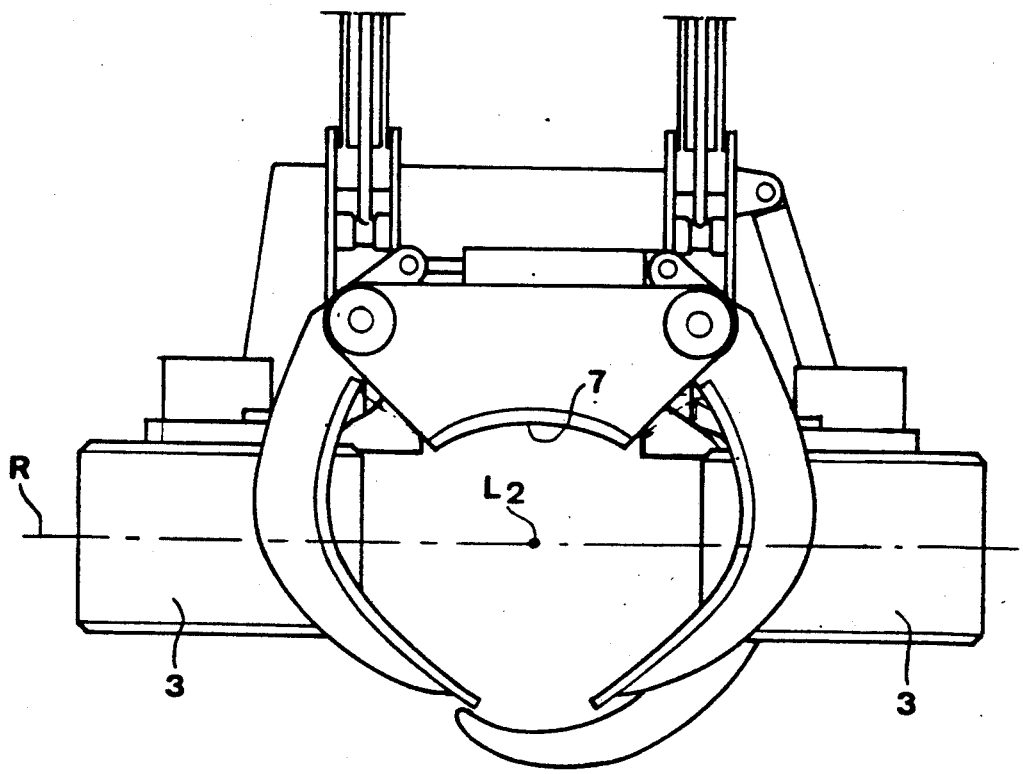
FIG. 10 is a view similar to FIG. 9 but illustrating an adjustment for a coarse trunk or object.

The delimbing member 5 rigidly mounted relative to the body structure 1 forms, with its trunk contact surface 7 and possibly in combination with further components for this purpose on the body structure 1, means, which by contacting the trunk locate the same so that longitudinal center lines of different tree trunks will obtain different positions generally transversely to the direction R of the relative mobility of the feed rolls 3 towards and away from each other in dependence upon the coarseness of the trunks. In other words, the upper mantle surface portion of the trunks will contact the surface 7 in the position of the processor for delimbing, said position being illustrated in FIGS. 7-12 and in which the trunk is located generally horizontally. This means that with the processor adjusted for a relatively thin trunk (see FIG. 9) the longitudinal center line L1 of the trunk will lie relatively close to the support surface 7. However, with a relatively coarse trunk held in the processor the longitudinal center line L2 of the trunk will lie relatively far from the support surface 7 (Fig 10).

The processor comprises means 24, 25 to displace each of the feed rolls 3 relative to the body structure 1 and accordingly relative to the support surface 7 in order to maintain the feed rolls in a position generally opposite to the trunk on either sides thereof independently of the varying location of the longitudinal center line of the trunk occurring due to coarseness variation. This appears clearly on a comparison of FIGS. 9 and 10, from which it appears that the feed rolls 3 in FIG. 9 are located in a relatively high position with middle points of their adjacent peripherical portions on the same level as and opposite to the indicated longitudinal center line L1 of a relatively thin trunk. In FIG. 10 on the other hand, the feed rolls 3 are lowered relative to the position in FIG. 9 so that still middle points on the adjacent peripherical portions of the feed rolls are located opposite to each other and on the same level as the longitudinal center line L2 for a more coarse trunk.

Figure 11:
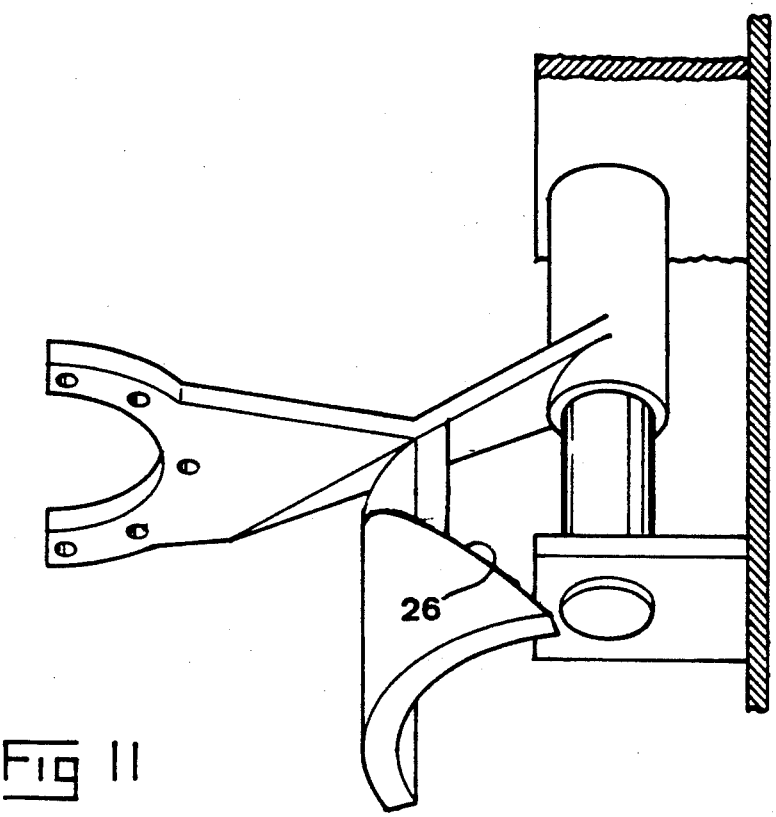
FIG. 11 is an enlarged perspective detail view of a portion of the device; according to FIGS. 7–10.
Figure 12:
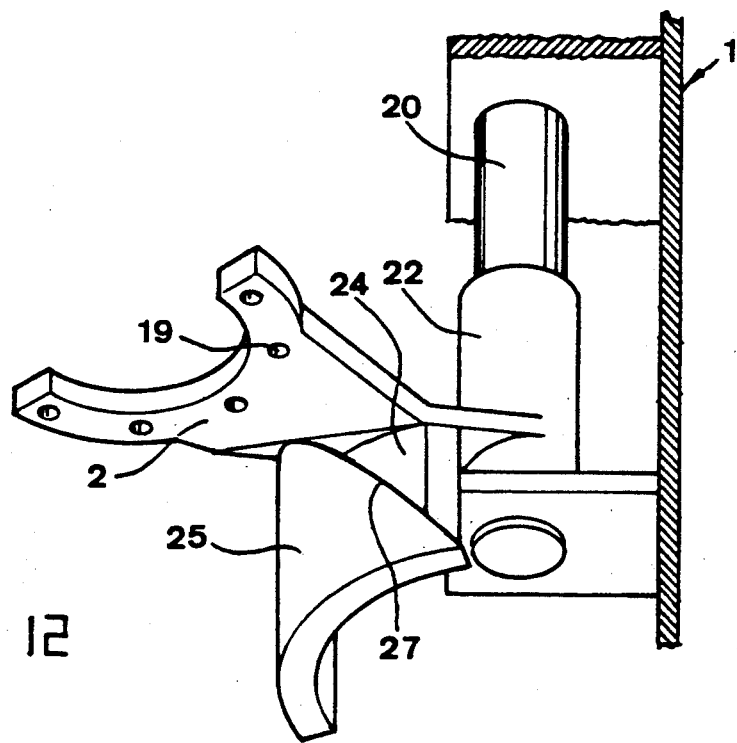
FIG. 12 is a view similar to FIG. 11 but illustrating a different position.

The displacement means comprise for each of the feed rolls 3 control members 24, 25. The more specific design for one of the feed rolls 3 is indicated in FIGS. 11 and 12, namely for the feed roll located to the left in FIG. 7, the viewing direction being perspective and obliquely from behind. It is to be understood that the arrangement is entirely analogous for the other of the feed rolls.

The control members 24, 25 are arranged for producing the displacement of the feed roll in question in a predetermined relation to the movement of the feed roll towards and away from the other feed roll. More specifically, the control members 24, 25 are of a mechanically interacting design, a first control member 24 being connected to a support member 2, whereas a second control member 18 interacting with the first control member is connected to the body structure 1. The feed roll 3 itself does not appear from FIGS. 11 and 12 but it is intended to be secured to the extreme end of the support member 2 by means of securing means projecting through the holes 19. For the rest, the feed rolls may be of the type comprising hydraulic motors built into their hubs.

Each of the support members 2 is pivotably arranged on the body structure 1 about axes 20 generally parallel to the axes of rotation of the feed rolls. The feed rolls 3 and support members 2 will accordingly be pivotable in parallel planes towards and away from a trunk received in the processor, the axes of rotation of the feed rolls extending perpendicularly to these planes, which are generally parallel to planes being horizontal and extending through longitudinal center lines for trunks in the processor.

The feed rolls 3 will accordingly describe pivoting movements towards and away from each other. It appears from this that the previously mentioned direction R for the relative movement of the feed rolls towards and away from each other should be interpreted as an indication in general of what is intended, namely the movement components of the feed rolls giving rise to movement of the rolls towards and away from each other respectively.

The control members 24, 25 are arranged to produce displacement of each of the support members 2 along axis 20 (see again FIGS. 11 and 12) simultaneously with pivoting of the support member 2 about axis 20. The axis 20 is the embodiment an axle secured to the body structure 1 against relative rotation thereto, whereas the support member 2 comprises a sleeve 22 surrounding axle 20. The control member 25 forms a guide path 26 sloping relative to axis 20, the control member 24 being movably supported on said guide path. More specifically, the control member 24 comprises a guide surface 27 sloping in correspondence to the guide path 26.

A power means 4 of a type variable in length, e.g. a hydraulic cylinder, is in the embodiment arranged for each of the support members 2. It appears from FIGS. 7 and 8 how this power means with its one end is connected to body structure 1 and with its other end to support member 2. As can be seen, the power means extends somewhat obliquely in the same sense as the sloping guide surfaces 26, 27 of the control members but the sloping of the latter is greater than the sloping of the power means 4. The guide surfaces 26, 27 have such a slope that the support member 2, on extensioning of the power means 4, with associated feed roll will be rotated inwardly towards the other feed roll at the same time as the support member and feed roll are raised during the movement of control member 24 on the guide path 26. Since the corresponding is valid for the other feed roll it is now apparent that the processor in dependence upon trunk coarseness is adjustable between the positions according to FIGS. 9 and 10 and that pivoting of the support members and feed rolls automatically cause the displacement along axles 20 which is aimed at. It is evident that power means 4, due to the inclination which occurs should be attached to body structure 1 and support member 2 by hinges of a universal type.

The advantage with the embodiment according to FIGS. 11 and 12 is that the control members 24, 25, which suitably have a curved design with the axis of axle 20 as a center, may be arranged at a considerable radial distance to this axis so that more favourable load conditions are obtained than in the embodiment according to FIGS. 5 and 6.

The processor is used in the following way: when gripping a standing tree, the processor is pivoted about 90° by means of power means 16 so that the axes of rotation of feed rolls 3 become generally horizontal. The feed rolls are then moved away from each other. The trunk may be embraced by means of arms 6 and 10, whereupon the tree is cut by the cutting device 12. The trunk is then rotated to horizontal position (see FIG. 7), whereupon feed rolls 3 are pressed against the trunk and the latter can be fed through the processor while the members 5, 6 produce delimbing. The feed rolls 3 obtain automatically the correct height relative to the trunk by means of the combination of pivoting/raising of the support members 2 and feed rolls described with assistance of FIGS. 11 and 12. As the diameter of the trunk decreases towards the top, the feed rolls 3 are moved closer and closer to each other and they will successively be raised in dependence upon the diameter decrease.

DESCRIPTION OF ALTERNATIVE EMBODIMENTS

The invention is of course not limited to the described embodiments only. Thus, many other detail solutions may be in view to obtain the movement of the feed members 3 aimed at. It should be pointed out that the described embodiments are also applicable on such tree processors where trunks are laid in between feed members from above. In such a case the trunk in question will be actuated downwardly towards members equivalent to those forming the support surface 7 in the embodiments described. In other words the device then becomes such that the feed rolls assume relatively high positions when a coarse trunk is in question, whereas the feed rolls are present in low positions with a thin trunk. This is in principle corresponding to that which would be obtained if the embodiments described would be turned upside down. Such cinematic inversions of the embodiments described are intended to be included within the scope of the invention. It is to be pointed out that it is not necessary that both feed members 3 and support members 2 respectively are displaceable along the axes 20 or the like in the manner described above. Thus, it would be sufficient if only one of the feed members 3 and the associated support members 2 would be displaceable in such a manner whereas the remaining support member could be arranged to stationarily hold the associated feed member 3. From the description above of the embodiment according to FIGS. 7-12 it appears that the sloping support path 27 will forcefully, on pivoting of the support members 2 in a direction towards each other by means of power means 4, carry out displacement of the support members 2 along axes 20. On pivoting of support members 2 in the direction away from each other their displacement along the axes 20 will be dependent on gravity and of the sloping arrangement of the power means 4 so that they will pull the support members 2 obliquely downwardly. On the contrary, the groove 18 will, in the embodiment according to FIGS. 1-6, forcibly provide guiding so that gravity has no influence. The embodiment according to FIGS. 7-12 could also be modified to obtain an operation similar to the latter, in which case the support path 27 would be completed with an additional support path firmly secured to the body structure so that these two support paths between each other form a slot or interspace, in which a pin attached to the support member 2 or its sleeve 22 would be received. In this way the upper of the support paths would, on pivoting of the support member 2 in question away from the other support member, forcibly actuate the pin and accordingly the support member 2 to be displaced downwardly along axes 20. Also other modifications are possible within the scope of the invention.

I claim:

1. A device for feeding elongated objects having varied diameters, in particular tree trunks, said device comprising:
    a body structure;
    a pair of support members attached to the body structure, said support members supporting feed rollers for feeding the elongated object located between the feed rollers;

at least one of the pair of support members being pivotally moveable relative to the body structure by means of power means towards and away from the other of the pair of support members so as to adjust the distance between the feed rollers located on opposite sides of the elongated object to correspond to the diameter of the object;

the device comprising a locating member, which by abutting against the elongated object locates the same so that longitudinal center lines of the objects will obtain different positions generally transversely with respect to a direction for the relative mobility of the feed members towards and away from each other in dependence upon the diameter of the elongated objects;

the device being arranged to displace, on pivoting of the at least one of the pair of support members, the feed rollers to maintain them in a position generally opposite to the elongated object in accordance with the varying location of the longitudinal center line of the elongated object's diameter; and arranged to produce, simultaneously with pivoting of the at least one of the pair of support members, displacement of the at least one support member and the feed roller supported thereby.

2. The device according to claim 1, wherein the control members are designed to interact mechanically.

3. The device according to claim 2, wherein a first of the control members is connected to the support members, whereas a second of the control members interacting with the first control members is connected to the body structure.

4. The device according to claim 3, wherein the control members in unison define a path of movement extending obliquely relative to an axis about which the at least one of the pair of support members pivot.

5. The device according to claim 4, wherein the axis is an axle secured to the body structure against relative rotation thereto, the at least one of the pair of support members comprises a sleeve surrounding the axle, and that the second of the control members is formed by an obliquely extending groove in the axle whereas the first of the control members is formed by a projection arranged on the sleeve of the support member and received in the groove.

6. The device according to claim 4, wherein the second control member forms a guide path sloping relative to the axis, the first control member connected to the first support member being movably supported by said guide path.

7. The device according to claim 6, wherein the first control member comprises a guide surface sloping in correspondence to the guide path.

8. The device according to claim 6, wherein the guide path is arranged at a radial distance from the axis.

9. The device according to claim 1, further comprising adjustable means for delimbing and debarking said tree trunk, said adjustable means being mounted to said body structure and encircling said tree trunk.

10. The device according to claim 9, wherein said adjustable means are first and second pairs of arm-like members mounted to said body structure at opposing ends thereof, each of said pairs of arm-like members comprising hydraulic power means for actuating said arm-like members both toward and away from each other, said arm-like members being provided with shearing edges for delimbing and debarking said tree as said trunk is translated along said feed rollers.

11. The device according to claim 10, further including a delimbing member mounted to said body structure, said delimbing member having a shearing knife mounted thereon for engaging said tree trunk in combination with said shearing edges of said arm-like members.

12. The device according to claim 9, further comprising means for sectioning said tree trunk mounted to said body and engaging said tree trunk upon gripping of said tree trunk by said adjustable means.

13. The device according to claim 10, further comprising means for attaching said body structure to a standing tree.

14. The device according to claim 13, wherein said means for attaching comprises a carrying device upon which at least one power means is mounted, said at least one power means being actuated to cause upward rotation of said body structure so as to enable said adjustable means and said support means with associated feed rollers to attach to said standing tree.

* * * * *

UNITED STATES PATENT AND TRADEMARK OFFICE
CERTIFICATE OF CORRECTION

PATENT NO. : 5,219,010
DATED : June 15, 1993
INVENTOR(S) : PETER ERIKSSON

It is certified that error appears in the above-indentified patent and that said Letters Patent is hereby corrected as shown below:

```
Column 4, line 14, after "rolls", insert --3--.

Column 7, line 30, after "means", insert --4--.

Column 9, line 24, before "arranged", insert
        --control members--.
```

Signed and Sealed this

Twelfth Day of July, 1994

Attest:

BRUCE LEHMAN

Attesting Officer     Commissioner of Patents and Trademarks

UNITED STATES PATENT AND TRADEMARK OFFICE
Certificate

Patent No. 5,219,010                                                           Patented: June 15, 1993

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Peter Eriksson, Osterfarnebo, Sweden and Jan A. L. Eriksson, Osterfarnebo, Sweden.

Signed and Sealed this Eighth Day of June, 1999.

JOSEPH J. HALL III
*Supervisory Patent Examiner*
Art Unit 3725